(12) United States Patent
Shishido et al.

(10) Patent No.: US 8,902,286 B2
(45) Date of Patent: Dec. 2, 2014

(54) METHOD AND APPARATUS FOR DETECTING MOTION VECTOR, AND METHOD AND APPARATUS FOR PROCESSING IMAGE SIGNAL

(75) Inventors: Tomoyuki Shishido, Kawasaki (JP); Hideki Aiba, Moriya (JP)

(73) Assignee: JVC Kenwood Corporation (JP)

( * ) Notice: Subject to any disclaimer, the term of this patent is extended or adjusted under 35 U.S.C. 154(b) by 323 days.

(21) Appl. No.: 13/615,956

(22) Filed: Sep. 14, 2012

(65) Prior Publication Data
US 2013/0076859 A1    Mar. 28, 2013

(30) Foreign Application Priority Data

Sep. 27, 2011 (JP) ................................. 2011-211000

(51) Int. Cl.
| | |
|---|---|
| *H04N 13/00* | (2006.01) |
| *G06T 7/20* | (2006.01) |
| *H04N 19/51* | (2014.01) |
| *H04N 19/597* | (2014.01) |
| *H04N 19/85* | (2014.01) |
| *H04N 7/01* | (2006.01) |

(52) U.S. Cl.
CPC .......... *G06T 7/2013* (2013.01); *H04N 13/0018* (2013.01); *H04N 19/00587* (2013.01); *H04N 19/00769* (2013.01); *H04N 19/00903* (2013.01); *H04N 2013/0085* (2013.01); *H04N 7/0112* (2013.01); *G06T 2207/10021* (2013.01); *G06T 2207/20021* (2013.01)
USPC .......................................................... 348/43

(58) Field of Classification Search
CPC .................................................. H04N 13/0055
USPC ............................................................ 348/43
See application file for complete search history.

(56) References Cited

U.S. PATENT DOCUMENTS

| | | | | |
|---|---|---|---|---|
| 8,416,286 | B2 * | 4/2013 | Tanaka | 348/53 |
| 2002/0021261 | A1 * | 2/2002 | Werner | 345/8 |
| 2003/0223499 | A1 * | 12/2003 | Routhier et al. | 375/240.25 |
| 2009/0219382 | A1 * | 9/2009 | Routhier et al. | 348/43 |
| 2010/0188482 | A1 * | 7/2010 | Routhier et al. | 348/43 |
| 2010/0245547 | A1 * | 9/2010 | Tanaka | 348/51 |
| 2011/0149029 | A1 * | 6/2011 | Kellerman et al. | 348/43 |
| 2011/0310235 | A1 * | 12/2011 | Sasaki et al. | 348/54 |

FOREIGN PATENT DOCUMENTS

JP    2009200802    9/2009

\* cited by examiner

*Primary Examiner* — Sath V Perungavoor
*Assistant Examiner* — James Pontius
(74) *Attorney, Agent, or Firm* — Cantor Colburn LLP

(57) ABSTRACT

Provided is a motion vector detecting apparatus capable of detecting a motion vector of a pulldown-converted 3D image signal with high precision. A pulldown detecting unit detects whether a 3D image signal is a pulldown-converted image signal. An LR separating unit outputs an LR separation signal separated into left and right image signals in each of frames having the same image content. A frame delay LR separating unit outputs a frame delay LR separation signal separated into left and right image signals in a frame before one repetition period. A motion vector detector detects motion vectors of the left and right image signals, An LR combination unit combines the motion vectors of the left and right image signals to output the combined motion vectors as a motion vector.

12 Claims, 12 Drawing Sheets

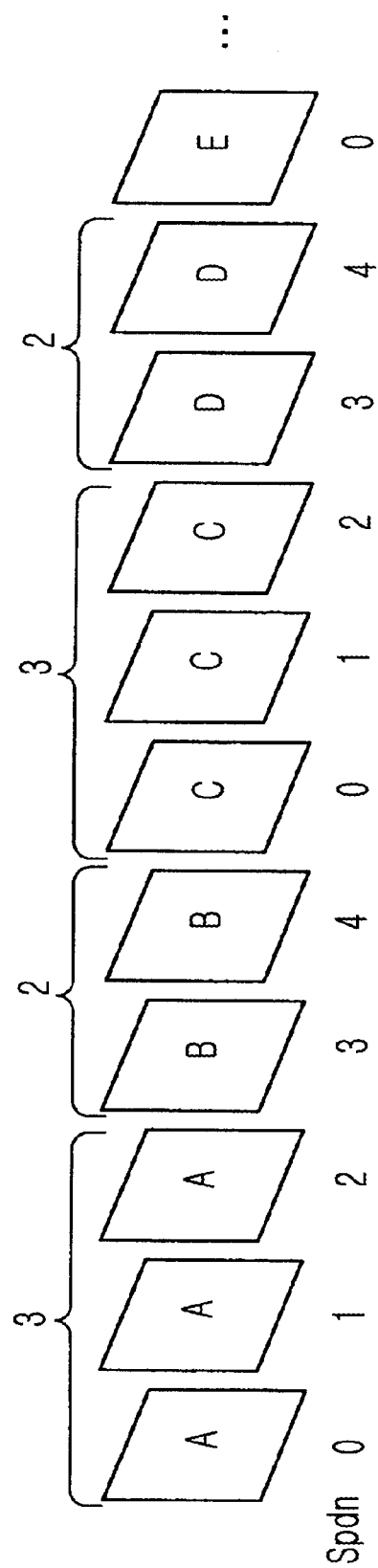

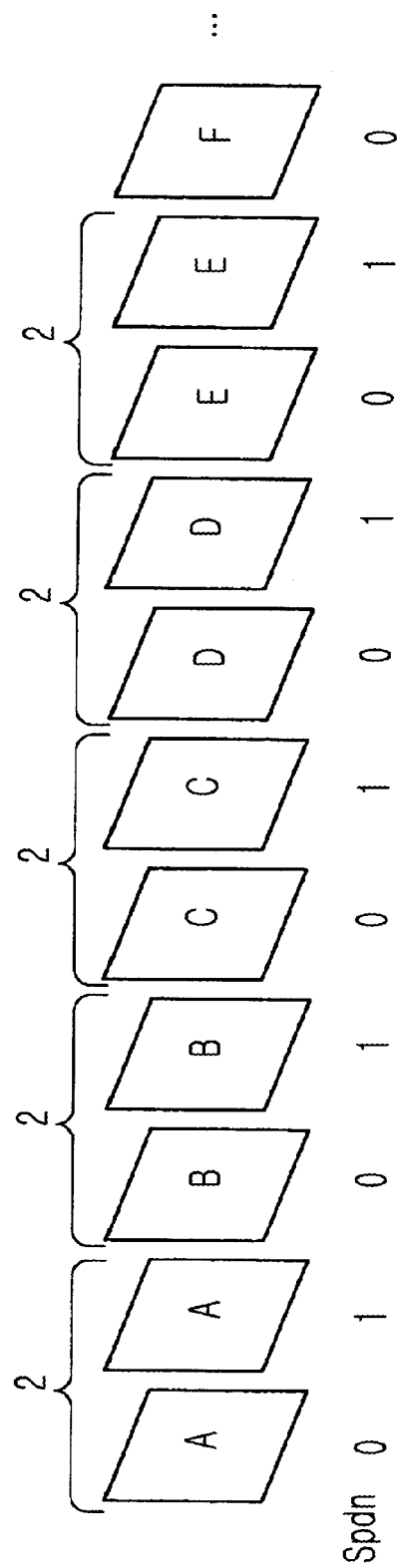

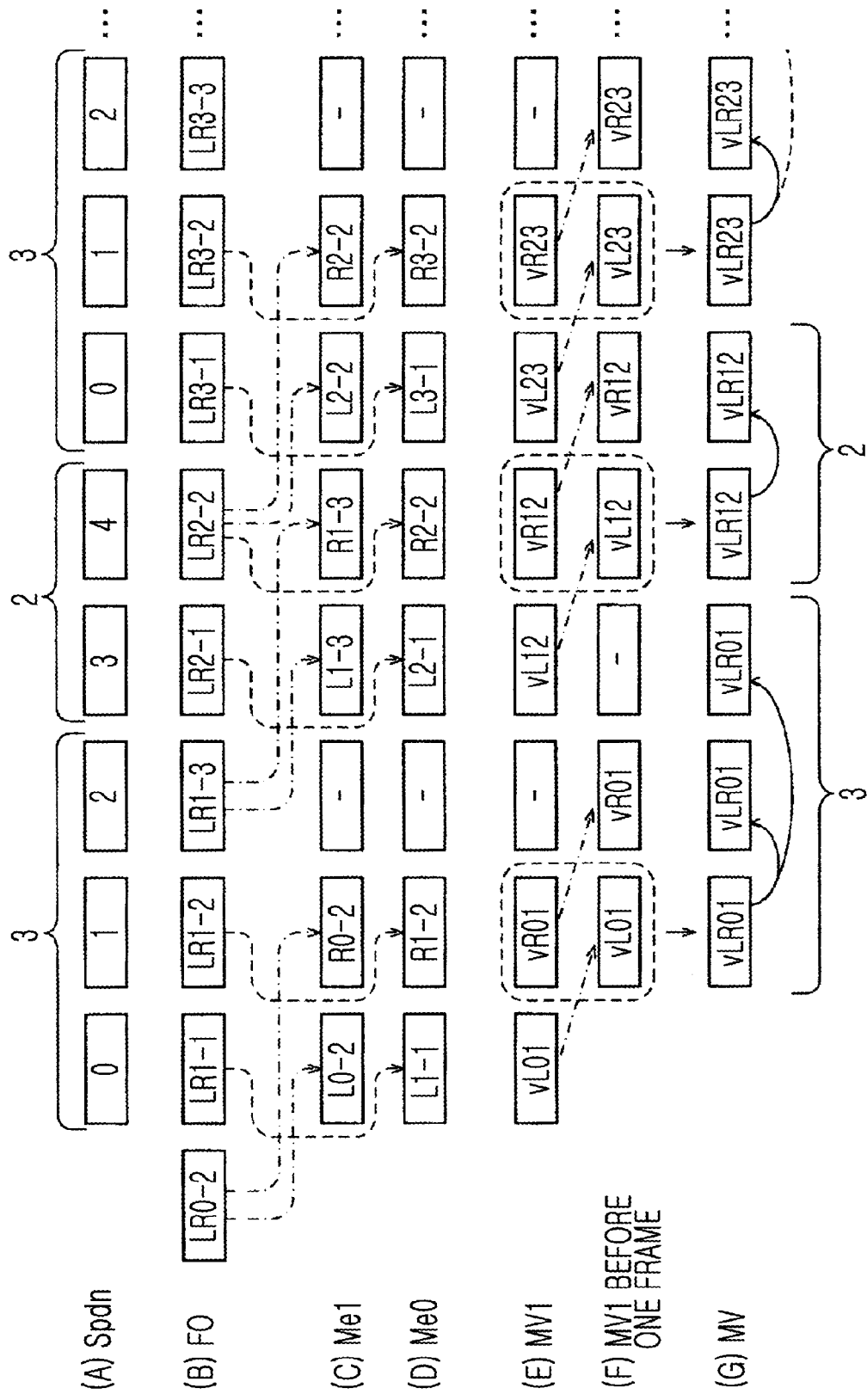

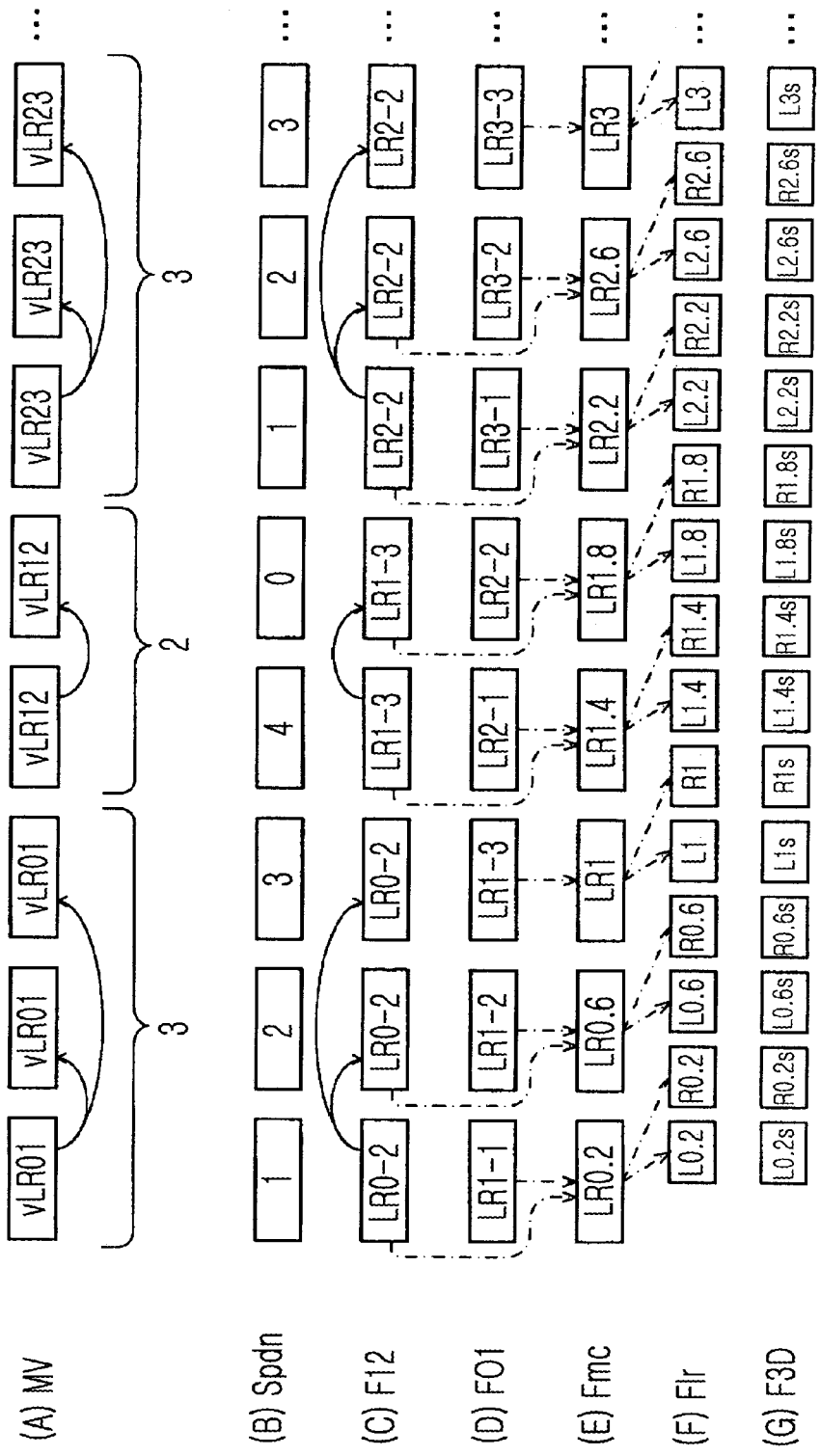

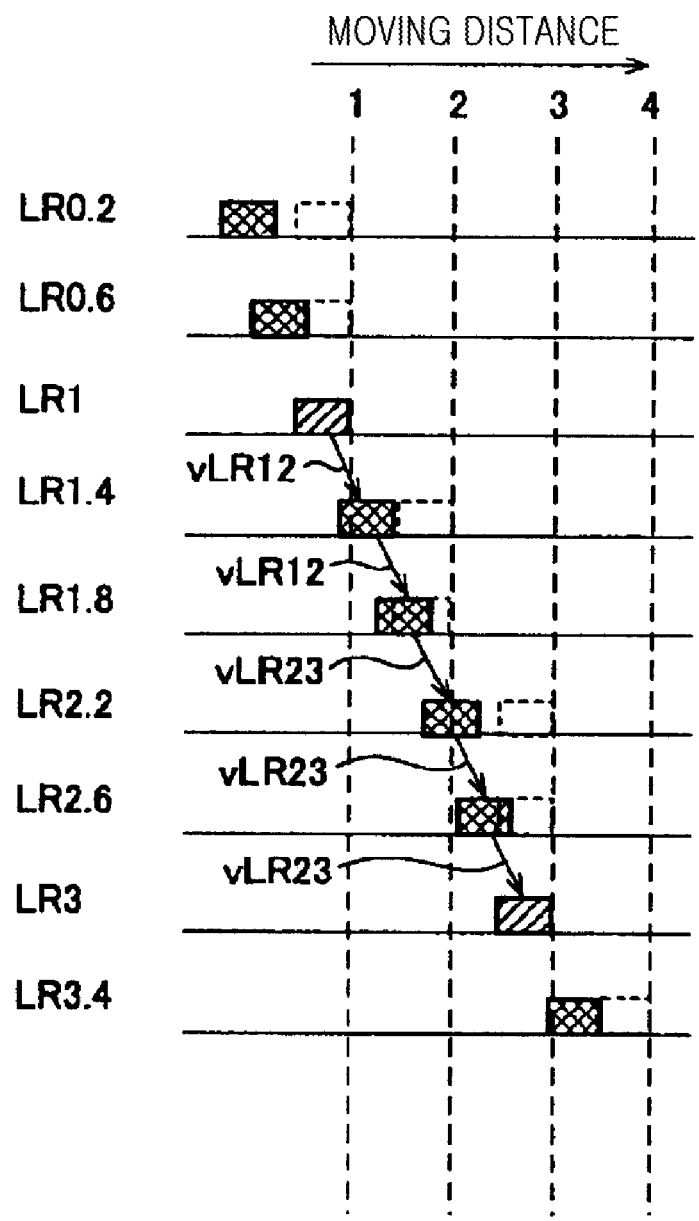

METHOD AND APPARATUS FOR DETECTING MOTION VECTOR, AND METHOD AND APPARATUS FOR PROCESSING IMAGE SIGNAL

CROSS-REFERENCE TO RELATED PATENT APPLICATIONS

This application claims the benefit of Japanese Patent Application No. 2011-211000 filed on Sep. 27, 2011, in the Japanese Patent Office, the disclosure of which is incorporated herein in its entirety by reference.

BACKGROUND OF THE INVENTION

1. Field of the Invention

The present invention relates to a motion vector detecting apparatus for detecting a motion vector of an image and a motion vector detecting method used by the motion vector detecting apparatus, and an image signal processing apparatus for generating a motion-compensated frame by using the motion vector and an image signal processing method used by the image signal processing apparatus.

2. Description of the Related Art

If a video is displayed on an image display device using a liquid crystal panel, a motion blur is easily generated. Thus, in order to improve a video characteristic by reducing a motion blur, the number of frames is increased by interpolating a compensated frame between real frames of an image signal. For example, an image is displayed by converting a frame rate having a vertical frequency of 60 Hz to double, i.e., 120 Hz, or more. A frame rate converting apparatus for converting a frame rate of an image signal detects a motion vector of an image, generates a compensated pixel by using the motion vector, and generates a compensated frame serving as a motion-compensated frame interpolated between real frames.

An image signal includes an image signal in which 24 (24 Hz) frames per second (fps) is converted into 60 fps as in a film image of a movie. In this case, a 2-3 pulldown conversion of converting 24 fps (24 Hz) into 60 fps is used, wherein the 2-3 pulldown conversion is performed by sequentially repeating a process of continuing one cut of a film image for three frames, continuing the next cut for two frames, and then continuing the next cut for three frames. Thus, an image signal of which a frame rate is converted into a vertical frequency of 60 Hz by the 2-3 pulldown conversion does not have smooth motion, and this state is referred to as film judder.

Accordingly, a film judder removing apparatus for removing film judder to form an image signal having smooth motion by generating a motion-compensated frame using a plurality of real frames and a motion vector and by replacing the real frames by the motion-compensated frame is used. A method of removing film judder through a film judder removing apparatus and increasing a frame rate through a frame rate converting apparatus is also used.

Recently, stereoscopic image technology (three-dimensional (3D) image) is spreading rapidly, and thus, a 3D image signal is supplied to an image signal processing apparatus such as a frame rate converting apparatus or a film judder removing apparatus. A format of the 3D image signal includes a format in which an image for a left eye and an image for a right eye are compressed and aligned in a horizontal direction or a vertical direction in one frame. In this case, a left-eye image signal and a right-eye image signal are compressed to half in a horizontal direction or a vertical direction, respectively, and thus, a detection precision of a motion vector is decreased. If a 3D image signal is a pulldown-converted image signal, a distance in which an image moves in one frame is increased, and thus, the detection precision of the motion vector is further decreased.

As such, if an image signal is a pulldown-converted 3D image signal through pulldown conversion, it is difficult to detect a motion vector with high precision. Accordingly, in an image signal processing apparatus for generating a motion-compensated frame, a wrong compensation may easily occur, and image quality of the motion-compensated frame may deteriorate.

3. Prior Art Reference (Patent Reference 1 Japanese Laid-Open Patent Publication No. 2009-200802

SUMMARY OF THE INVENTION

The present invention provides a motion vector detecting apparatus capable of detecting a motion vector of a pulldown-converted 3D image signal with high precision, and a motion vector detecting method used by the motion vector detecting apparatus.

The present invention also provides an image signal processing apparatus capable of generating a high-definition motion-compensated frame by detecting a motion vector of a pulldown-converted 3D image signal with a high precision, and an image signal processing method used by the image signal processing apparatus.

According to an aspect of the present invention, a motion vector detecting apparatus comprising: a pulldown detecting unit which detects whether a 3D image signal in which a left-eye image signal and a right-eye image signal are compressed and disposed within one frame is a pulldown-converted image signal: an LR separating unit which outputs an LR separation signal separated into the left-eye image signal and the right-eye image signal in each of frames having the same image content by sequentially separating the left-eye image signal and the right-eye image signal for each frame in any order within a repetition period in which frames having the same image content are repeated, when the pulldown detecting unit detects that the 3D image signal is a pulldown-converted image signal; a frame delay LR separating unit which outputs a frame delay LR separation signal separated into a left-eye image signal and a right-eye image signal in a frame before one repetition period by allowing the left-eye image signal and the right-eye image signal of the LR separation signal to correspond to each other, when the pulldown detecting unit detects that the 3D image signal is a pulldown-converted image signal; a motion vector detecting unit which detects a first motion vector of the left-eye image signal through the left-eye image signal of the LR separation signal and the left-eye image signal of the frame delay LR separation signal and a second motion vector of the right-eye image signal through the right-eye image signal of the LR separation signal and the right-eye image signal of the frame delay LR separation signal; and an LR combination unit which delays any one of the first motion vector and the second motion vector to coincide the timings of both frames and combines the first motion vector and the second motion vector in units of frames to output the combined first motion vector and second motion vector as a motion vector.

The motion vector detecting unit may detect the first and second motion vectors by increasing the number of pixels by compensating for thinned out pixels in the 3D image signal.

The motion vector detecting unit may detect the first and second motion vectors by increasing the number of pixels by compensating for non-existing pixels in the 3D image signal.

The 3D image signal may be a 2-3 pulldown-converted image signal, wherein the LR separating unit may sequentially separate the left-eye image signal and the right-eye image signal in an initial frame and the next frame from among three frames in any order within a first repetition period in which frames having the same image content are repeated for three frames, wherein the LR separating unit may sequentially separate the left-eye image signal and the right-eye image signal in any order within a second repetition period in which frames having the same image content are repeated for two frames.

When the pulldown detecting unit detects that the 3D image signal is not a pulldown-converted image signal, the LR separating unit may output each of the frames without separating the left-eye image signal and the right-eye image signal of each of the frames. wherein the frame delay LR separating unit may output the previous frame of one frame of each of the frames output from the LR separating unit without separating the left-eye image signal and the right-eye image signal of each of the frames, wherein the motion vector detecting unit may detect motion vectors of each of the frames by using an image signal of the frame output from the LR separating unit and an image signal of the frame output from the frame delay LR separating unit.

According to another aspect of the present invention, a motion vector detecting method comprising: detecting whether a 3D image signal in which a left-eye image signal and a right-eye image signal are compressed and disposed within one frame is a pulldown-converted image signal; generating an LR separation signal separated into the left-eye image signal and the right-eye image signal in each of frames having the same image content by sequentially separating the left-eye image signal and the right-eye image signal for each frame in any order within a repetition period in which frames having the same image content are repeated, when it is detected that the 3D image signal is a pulldown-converted image signal; generating a frame delay LR separation signal separated into a left-eye image signal and a right-eye image signal in a frame before one repetition period by allowing the left-eye image signal and the right-eye image signal to correspond to each other, when it is detected that the 3D image signal is a pulldown-converted image signal; detecting a first motion vector of the left-eye image signal through the left-eye image signal of the LR separation signal and the left-eye image signal of the frame delay LR separation signal: detecting a second motion vector of the right-eye image signal through the right-eye image signal of the LR separation signal and the right-eye image signal of the frame delay LR separation signal; and generating motion vectors of each of the frames by delaying any one of the first motion vector and the second motion vector to coincide the timings of both frames and combining the first motion vector and the second motion vector in units of frames.

The first and second motion vectors may be detected by increasing the number of pixels by compensating for thinned out pixels in the 3D image signal.

The first and second motion vectors may be detected by increasing the number of pixels by compensating for non-existing pixels in the 3D image signal.

The 3D image signal may be a 2-3 pulldown-converted image signal, wherein the left-eye image signal and the right-eye image signal may be sequentially separated in an initial frame and the next frame from among three frames in any order within a first repetition period in which frames having the same image content are repeated for three frames, wherein the left-eye image signal and the right-eye image signal may be sequentially separated in any order within a second repetition period in which frames having the same image content are repeated for two frames.

When it is detected that the 3D image signal is not a pulldown-converted image signal, a pair of frames that are offset by one frame may be sequentially generated without separating the left-eye image signal and the right-eye image signal in each of the frames, and the motion vectors of the frames may be detected by using the images signals of the two frames.

According to another aspect of the present invention, an image signal processing apparatus comprising: the motion vector detecting apparatus described above: and a motion-compensated frame generating unit which generates a motion-compensated frame by using a 3D image signal and a motion vector detected by the motion vector detecting apparatus when it is detected that the 3D image signal is a pulldown-converted image signal and at least partially replaces a real frame of the 3D image signal by the motion-compensated frame.

According to another aspect of the present invention, an image signal processing method comprising: generating a motion-compensated frame by using a 3D image signal in which a left-eye image signal and a right-eye image signal are compressed and disposed within one frame and a pulldown-converted and using a motion vector detected through the motion vector detecting method described above; and at least partially replacing a real frame of the 3D image signal by the motion-compensated frame.

BRIEF DESCRIPTION OF THE DRAWINGS

The above and other features and advantages of the present invention will become more apparent by describing in detail exemplary embodiments thereof with reference to the attached drawings in which:

FIGS. 2A and 2B are diagrams for describing 2-3 pulldown and 2-2 pulldown conversion, according to an embodiment of the present invention;

FIG. 4 is a diagram for describing operations when a pulldown-converted image signal is input to the motion vector detecting apparatus of FIG. 1;

FIG. 9 is a diagram for describing operations of the image signal processing apparatus of FIG. 8; and FIGS. 10A and 10B are diagrams for describing an operation of removing film judder via the image signal processing apparatus of FIG. 8.

DETAILED DESCRIPTION OF THE INVENTION

Hereinafter, the present invention will be described in detail by explaining exemplary embodiments of the invention with reference to the attached drawings.

<Embodiment of Apparatus and Method of Detecting Motion Vector>

Figure 1:
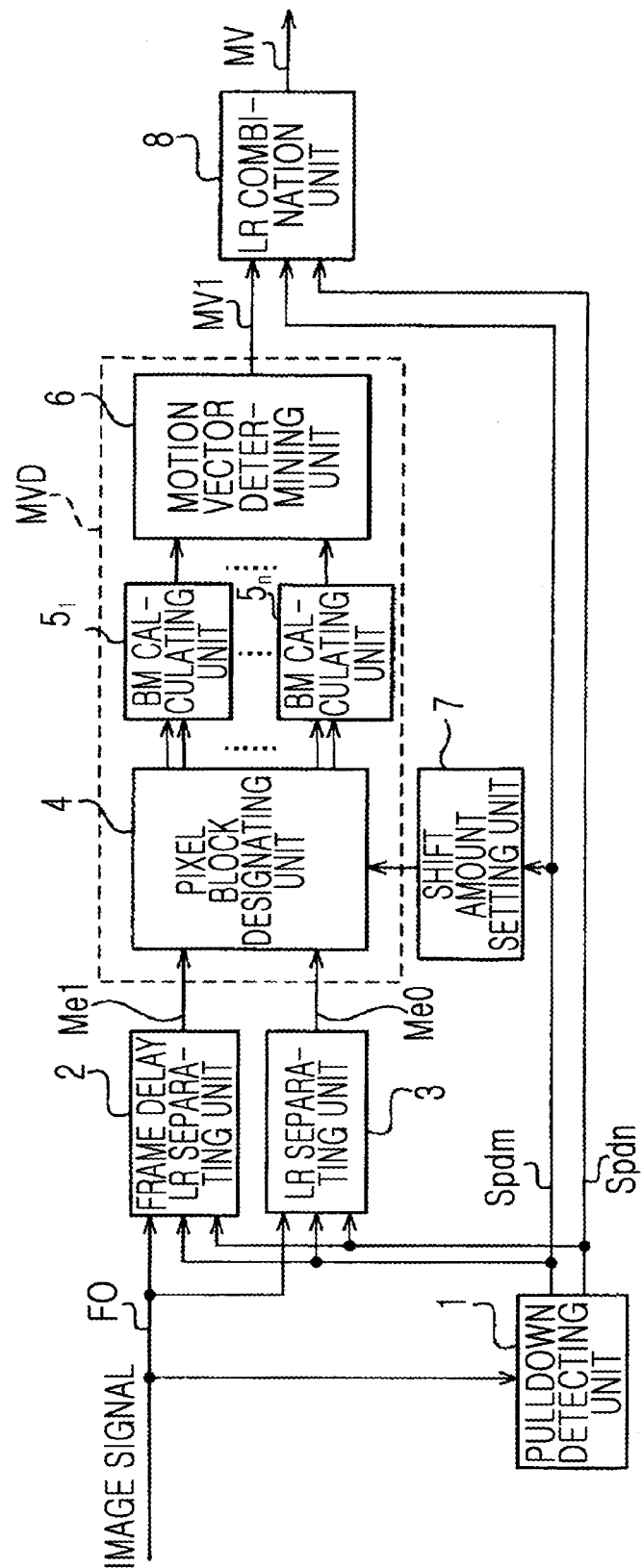
FIG. 1 is a block diagram of a motion vector detecting apparatus according to an embodiment of the present invention.

In FIG. 1, each pixel data of an image signal is sequentially input to a pulldown detecting unit 1, a frame delay LR separating unit 2, and an LR separating unit 3, The image signal input to the pulldown detecting unit 1, the frame delay LR separating unit 2, and the LR separating unit 3 is referred to as an image signal F0. The pulldown detecting unit 1 detects a repetition period of a frame of the image signal F0 to detect whether the image signal F0 is a pulldown-converted image signal.

FIG. 2A shows an 2-3 pulldown-converted image signal as described above, wherein A, B, C, D, E, etc, show image contents of each of the frames. As shown in FIG. 2A, the same image content is sequentially repeated in three frames, two frames, three frames. FIG. 2B shows an image signal in which a 30 fps (30 Hz) is converted into a 60 fps. In FIG. 2B, A, B, C, D, E, F, . . . show image contents of each of the frames. A method of converting 30 fps into 60 fps by interlacing two frames for 1 cut is referred to as 2-2 pulldown conversion.

If the image signal F0 is a pulldown-converted image signal, the pulldown detecting unit 1 detects whether the image signal F0 is a 2-3 pulldown-converted image signal or a 2-2 pulldown-converted image signal. The pulldown detecting unit 1 generates and outputs a mode detecting signal Spdm indicating whether the image signal F0 is a pulldown-converted image signal and whether the image signal F0 is a 2-3 pulldown-converted image signal or a 2-2 pulldown-converted image signal.

Also, the pulldown detecting unit 1 generates and outputs a sequence management number Spdn that is allocated to a pulldown sequence, which is a repetition period of pulldown. FIGS. 2A and 2B show the sequence management numbers Spdn for all frames. In 2-3 pulldown, 5 frames, that is, the sum of three frames having the same image content and two frames having the same image content, is one duration, as shown in FIG. 2A, and numbers 0 to 4 are allocated as the sequence management numbers Spdn. In the 2-2 pulldown, two frames having the same image content is one duration, and numbers 0 and 1 are allocated as the sequence management numbers Spdn as shown in FIG. 2B.

A mode detecting signal Spdm output from the pulldown detecting unit 1 is input to the frame delay LR separating unit 2, the LR separating unit 3, a shift amount setting unit 7, and an LR combination unit 8. The sequence management number Spdn output from the pulldown detecting unit 1 is input to the frame delay LR separating unit 2, the LR separating unit 3, and the LR combination unit 8. Hereinafter, a case where the image signal F0 is a 2-3 pulldown-converted image signal shown in FIG. 2A will be described.

Figure 3A:
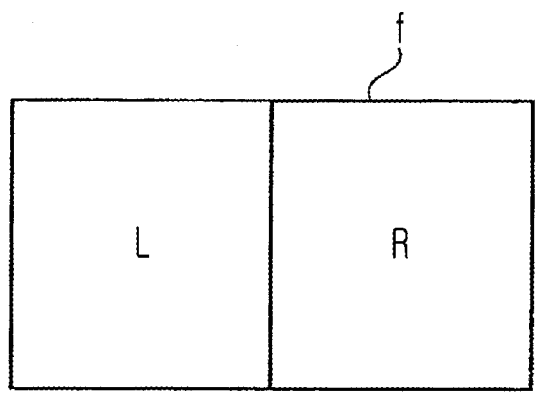
FIGS. 3A and 3B are diagrams for describing a format of a 3D image signal, according to an embodiment of the present invention.
Figure 3B:
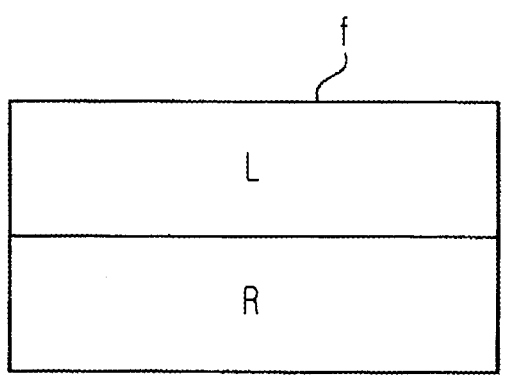

The image signal F0 input to the frame delay LR separating unit 2 and the LR separating unit 3 is a 3D image signal (hereinafter, referred to as a 3D image signal F0). A format of the 3D image signal F0 may be a side-by-side type format in which a left-eye image signal represented by "L" and a right-eye image signal represented by "R" are compressed by half in a horizontal direction and aligned in a frame f in the horizontal direction, as shown in FIG. 3A. Also, the format of the 3D image signal F0 may be a top-and-bottom type format in which the left-eye image signal represented by "L" and the right-eye image signal represented by "R" are compressed by half in a vertical direction and aligned in the frame f in the vertical direction, as shown in FIG. 3B. Hereinafter, a case that the format of the 3D image signal F0 is a side-by-side type format will be described.

With reference to FIGS. 4(A) and (B), operations of the frame delay LR separating unit 2 and the LR separating unit 3 will be described. FIG. 4(B) shows frames of a 3D image signal F0, and FIG. 4(A) shows sequence management numbers Spdn output from the pulldown detecting unit 1. The frames LR1-1, LR1-2, and LR1-3 have the same image content. The frames LR2-1 and LR2-2 have the same image content. The frames LR3-1, LR3-2, and LR3-3 have the same image content.

The frame delay LR separating unit 2 includes a frame memory corresponding to two frames. The frame delay LR separating unit 2 delays the frame LR0-2 right before the frame LR1-1 corresponding to one frame to separate into an image signal L0-2 corresponding to the left-eye image signal L described with reference to FIG. 3A at a time of a frame LR1-1, and thus, the frame delay LR separating unit 2 outputs the image signal L0-2 as a frame delay LR separation signal Me1 as shown in FIG. 4(C). Also, the frame delay LR separating unit 2 delays the frame LR0-2 corresponding to two frames to separate an image signal R0-2 corresponding to the image signal R of the image for the right eye-image image signal R described with reference to FIG. 3A at time of a frame LR1-2, and thus, the frame delay LR separating unit 2 outputs the image signal R0-2 as the frame delay LR separation signal Me1 as shown in FIG. 4(C).

The LR separating unit 3 separates an image signal L1-1 corresponding to the left-eye image signal L from the frame LR1-1 as shown in FIG. 4D at the time of the frame LR1-1 and separates an image signal R1-2 corresponding to the right-eye image signal R from the frame LR1-2 at the time of the frame LR1-2 to sequentially output the image signal L1-1 and the image signal R1-2 as an LR separation signal Me0. The frame delay LR separation signal Me1 and the LR separation signal Me0 are not output at a time of a frame LR1-3.

Similarly, the frame delay LR separating unit 2 delays the frame LR1-3 corresponding to one frame to separate an image signal L1-3 at a timing of a frame LR2-1 and separate an image signal R1-3 at a time of a frame LR2-2 as shown in FIG. 4(C), and thus, the frame delay LR separating unit 2 sequentially outputs the image signal L1-3 and the image signal R1-3 as the frame delay LR separation signal Me1. The LR separating unit 3 separates an image signal L2-1 at the time of the frame LR2-1 and separates an image signal R2-2 at the time of the frame LR2-2 as shown in FIG. 4(D), and thus, the LR separating unit 3 sequentially outputs the image signal L2-1 and the image signal R2-2 as the LR separation signal Me0. The same operations are repeated after a time of a frame LR3-1.

The frame delay LR separating unit 2 and the LR separating unit 3 use the sequence management number Spdn to determine how to separate the frame delay LR separation signal Me1 and the LR separation signal Me0. The frame delay LR separating unit 2 and the LR separating unit 3 use the mode detecting signal Spdm to determine whether to perform a unique separation operation on a pulldown-converted signal as shown in FIG. 4.

As described above, pixel data constituting the left-eye image signal L and pixel data constituting the right-eye image signal R of the 3D image signal F0 in which a frame is delayed are sequentially output as the frame delay LR separation signal Me1 for each frame from the frame delay LR separating unit 2. Also, pixel data constituting the left-eye image signal L and pixel data constituting the right-eye image signal R of the 3D image signal F0 of each input frame are sequentially output as the LR separation signal Me0 from the LR separating unit 3. Also, the order of separating the left-eye image signal L and the right-eye image signal R may be opposite to that shown in FIG. 4.

When the pulldown detecting unit 1 detects that the 3D image signal F0 is a pulldown-converted image signal, the LR separating unit 3 sequentially separates the left-eye image signal L and the right-eye image signal R for each frame in any order within a repetition period in which frames having the same image content are repeated, and thus, the LR separating unit 3 outputs the LR separation signal Me0 for separating the left-eye image signal L and the right-eye image signal R in the frames having the same image content.

When the pulldown detecting unit 1 detects that the 3D image signal F0 is a pulldown-converted image signal, the frame delay LR separating unit 2 allows the left-eye image signal L and the right-eye image signal R of the LR separation signal Me0 to correspond to each other, and thus, the frame delay LR separating unit 2 outputs the frame delay LR separation signal Me1 for separating the left-eye image signal L and the right-eye image signal R in a frame before one repetition period. The frame before one repetition period refers to the previous frame in the original film image before the pulldown conversion.

The frame delay LR separation signal Me1 and the LR separation signal Me0 are input to a pixel block designating unit 4 inside a motion vector detector MVD. The pixel block designating unit 4 includes a plurality of line memories and a plurality of pixel delay devices. When the pixel block designating unit 4 detects a motion vector based on pixel data included in the frame delay LR separation signal Me1, the LR separation signal Me0 is sequentially delayed by the plurality of line memories and the plurality of pixel delay devices, thereby generating pixel data in a predetermined range in a horizontal direction and a vertical direction. The predetermined range in the horizontal direction and the vertical direction is a search range of the motion vector.

Figure 5A:
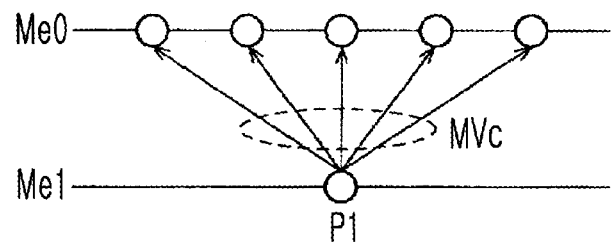
FIGS. 5A and 5B are diagrams for describing operations of a motion vector detector MVD of FIG. 1.

FIG. 5A is a conceptual diagram showing a search operation of a motion vector performed by the motion vector detector MVD based on a pixel P1 of the frame delay LR separation signal Me1. For simplification, FIG. 5A shows the search range of the motion vector only in a horizontal direction and shows the search range corresponding to five pixels in a horizontal direction. Actually, a planar predetermined range in a horizontal direction and a vertical direction is a search range, and a greater number of pixels correspond to the search range.

Figure 5B:
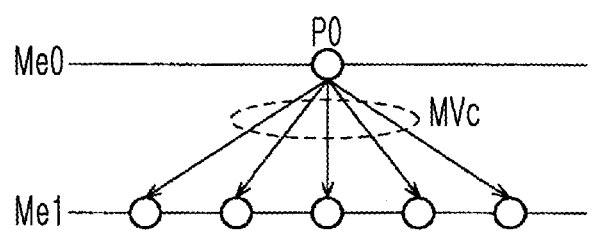

When the pixel block designating unit 4 detects the motion vector based on the pixel P1 of the LR separation signal Me0, the frame delay LR separation signal Me1 is sequentially delayed by the plurality of line memories and the plurality of pixel delay devices, thereby generating pixel data showing pixels in a predetermined range in a horizontal direction and a vertical direction. FIG. 5B is a conceptual diagram showing a search operation of the motion vector performed by the motion vector detector MVD based on a pixel P0 of the LR separation signal Me0. In order to improve a detection precision of the motion vector, the motion vector may be detected by using any one of or both the methods shown in FIGS. 5A and 5B.

The pixel block designating unit 4 designates a pixel block for generating a motion vector candidate MVc as shown in FIGS. 5A and 5B. The motion vector may be detected in units of pixels or in units of blocks that are a plurality of pixels. A pixel block includes one pixel. The pixel block designating unit 4 pairs a pixel block which is the basis of any one of the LR separation signal Me0 and the frame delay LR separation signal Me1 with a pixel block within the search range of the other one of the LR separation signal Me0 and the frame delay LR separation signal Me1 and supplies the pair of the pixel blocks to a plurality of block matching calculating units (BM calculating units) $5_1$ to $5_n$ inside the motion vector detector MVD.

The BM calculating units $5_1$ to $5_n$ calculate an absolute value sum of a difference between pixel data inside the pixel block which is the basis and pixel data inside the pixel block within the search range as a block matching error value, and apply the block matching error value to the motion vector candidates MVc to supply it to a motion vector determining unit 6 inside the motion vector detector MVD.

The motion vector determining unit 6 outputs the motion vector candidate MVc having a minimum block matching error value as a motion vector MV1. The motion vector candidate MVc having a minimum block matching error value has a highest correlation.

FIG. 4(E) shows the motion vector MV1 output from the motion vector determining unit 6. As shown in FIGS. 4(C) and (D), the frame delay LR separation signal Me1 and the LR separation signal Met) output during each frame are only the left-eye image signal L or the right-eye image signal R. As shown in FIG. 4(E), the motion vector detector MVD outputs a motion vector vL01 of the left-eye image signal L as the motion vector MV1 at the time of the frame LR1-1 and outputs a motion vector vR01 of the right-eye image signal R as the motion vector MV1 at the time of the frame LR1-2.

The motion vector detector MVD outputs a motion vector vL12 as the motion vector MV1 at the time of the frame LR2-1 and outputs a motion vector vR12 as the motion vector MV1 at the time of the frame LR2-2. The motion vector detector MVD outputs a motion vector vL23 as the motion vector MV1 at the time of the frame LR3-1 and outputs a motion vector motion vector vR23 as the motion vector MV1 at the time of the frame LR3-2.

The motion vector MV1 is input to the LR combination unit 8. The LR combination unit 8 includes a frame memory and delays the motion vector MV1 by one frame as shown in FIG. 4(F). In other words, the LR combination unit 8 delays any one of the motion vector MV1 of the left-eye image signal L and the motion vector MV1 of the right-eye image signal R to coincide the timings of both frames.

The LR combination unit 8 writes the motion vector MV1 shown in FIG. 4(E) and the motion vector MV1 before one frame shown in FIG. 4(F) in the frame memory and reads the written motion vectors MV1 to combine (synthesize) the motion vector MV1 of the left-eye image signal L and the motion vector MV1 of the right-eye image signal R. The combination of the motion vector MV1 of the left-eye image signal L and the motion vector MV1 of the right-eye image signal R may be performed by controlling a write address or a read address with respect to the frame memory.

When the mode detecting signal Spdm is in a mode showing pulldown conversion, the LR combination unit 8 outputs a motion vector MV obtained by synthesizing the motion vector MV1 of the left-eye image signal L and the motion vector MV1 of the right-eye image signal R. The LR combination unit 8 generates and outputs a motion vector vLR01 by synthesizing the motion vector vL01 and the motion vector vR01, as shown in FIG. 4(G), and continuously outputs the motion vector vLR01 during the next two frames with reference to the sequence management number Spdn. Also, the LR combination unit 8 generates and outputs a motion vector vLR12 obtained by synthesizing the motion vector vL12 and the motion vector vR12, and continuously outputs the motion vector vLR12 during the next frame with reference to the sequence management number Spdn.

According to the present embodiment, the motion vector MV accurately estimating motions of the left-eye image signal L and the right-eye image signal R in the pulldown-converted 3D image signal may be detected.

Figure 6:
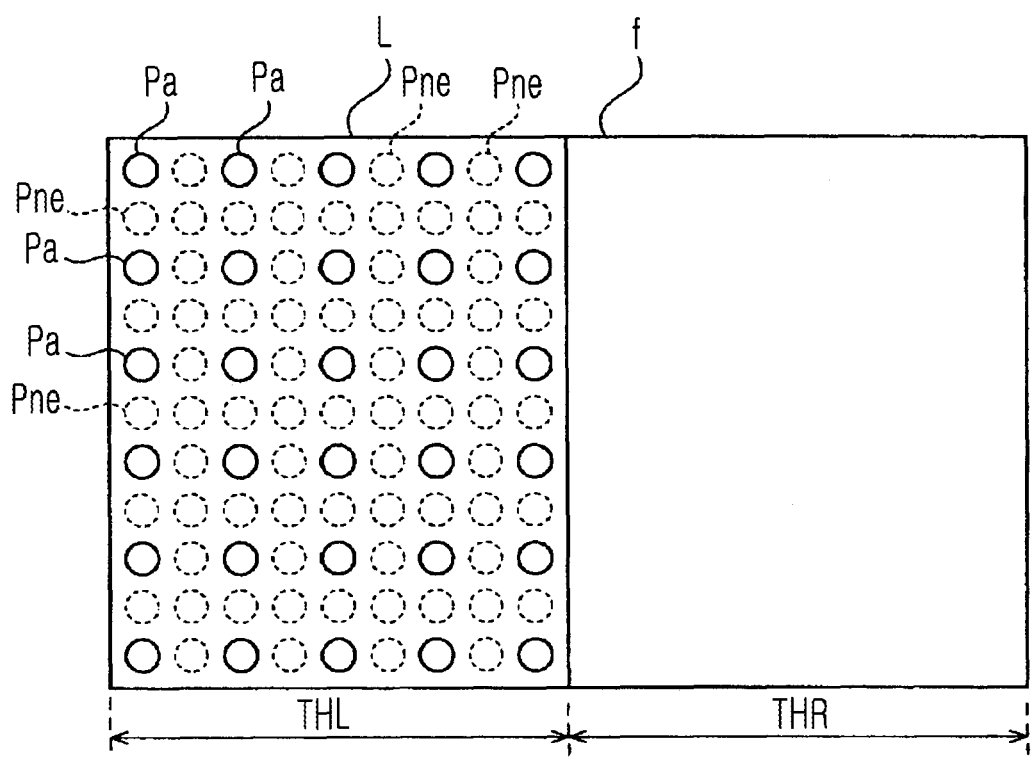
FIG. 6 is a conceptual diagram showing a left-eye image signal when pixels are thinned out.

However, in order to decrease a circuit size of a motion vector detecting apparatus, pixels of the 3D image signal F0 to be input to the motion vector detecting apparatus may be thinned out in a horizontal direction and a vertical direction. FIG. 6 is a conceptual diagram showing the left-eye image signal L when pixels are thinned out. In FIG. 6, pixels Pa shown as a solid line are real pixels, and pixels Pne shown as a broken line are non-existing pixels that are thinned out. The above-described detecting process of the motion vector MV may be performed during a section THL that is half one horizontal section shown in FIG. 6, and a section THR, which is the other half, remains as a processing section.

Thus, in the present embodiment, when the mode detecting signal Spdm is in a mode showing pulldown conversion, the shift amount setting unit 7 instructs the pixel block designating unit 4 to compensate for and generate (restore) the thinned out pixels Pne. If the number of pixels of the left-eye image signal L and the right-eye image signal R is increased, the number of motion vector candidates MVc may be increased, and thus, a detection precision of the motion vector MV may be improved.

When the section THL that is half one horizontal section or the section THR do not remain as the processing section, if the number of pixels is increased to generate a greater number of motion vector candidates MVc, the circuit size of the motion vector detecting apparatus should be significantly increased. In the present embodiment, since the section THL that is half one horizontal section or the section THR remains as the processing section, the detection precision of the motion vector MV may be improved by only slightly increasing the circuit size of the motion vector detecting apparatus, which is a degree at which an average circuit for generating a compensated pixel by averaging the pixels Pa adjacent to each other in a horizontal direction or a vertical direction is required.

Also, when the pixels of the 3D image signal F0 to be input to the motion vector detecting apparatus are not thinned out in a horizontal direction and a vertical direction, and more preferably, when the mode detecting signal Spdm is in a mode showing pulldown conversion, the shift amount setting unit 7 instructs the pixel block designating unit 4 to increase the number of pixels by compensating for and generating non-existing pixels of the 3D image signal F0. The non-existing pixels of the 3D image signal F0 are referred to as so-called sub-pixels. If sub-pixels are generated and the number of pixels of the left-eye image signal L and the right-eye image signal R is increased, the number of motion vector candidates MVc may be increased, and thus, a detection precision of the motion vector MV may be improved.

Hereinafter, operations when a general image signal, instead of a pulldown-converted image signal, is input as the 3D image signal F0 and a mode detection signal Spdm is a general image signal in FIG. 1 will be described. When the 3D image signal F0 is a general image signal, the motion vector detecting apparatus of FIG. 1 detects the motion vector MV by the same operations as a general motion vector detecting apparatus.

Figure 7:
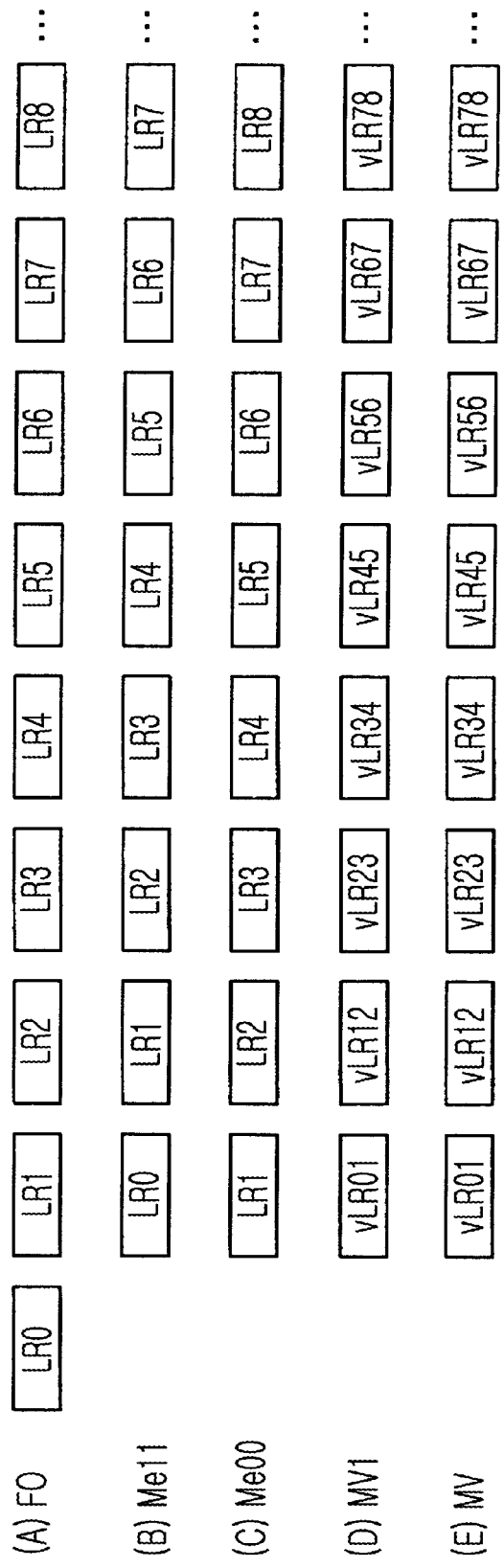
FIG. 7 is a diagram for describing operations when a general image signal, instead of a pulldown-converted image signal, is input to the motion vector detecting apparatus of FIG. 1.

FIG. 7(A) shows frames of the 3D image signal F0. Since the general image signal, instead of a pulldown-converted image signal, is input to the motion vector detecting apparatus, the frames having image contents different from frames LR0, LR1, LR3, LR4, etc. continue. The frame delay LR separating unit 2 delays the frames LR0, LR1, LR3, LR4, etc. by one frame through the frame memory corresponding to one frame from among the frame memory corresponding to two frames as shown in FIG. 7(B), and thus, the frame delay LR separating unit 2 outputs the delayed frames LR0, LR1, LR3, LR4, etc. as a frame delay signal Me11. The frame delay LR separating unit 2 does not separate the left-eye image signal L and the right-eye image signal R.

The LR separating unit 3 outputs the frames LR0, LR, LR3, LR4, etc. as an image signal Me00 without separating the left-eye image signal L and the right-eye image signal R, as shown in FIG. 7(C). The motion vector detector MVD generates the motion vector MV1 by using the image signal Me00, which is an image signal of the present frame, and the frame delay signal Me11 of the previous frame, as shown in FIG. 7(D). In this case, the motion vector MV1 output from the motion vector detector MVD is a motion vector of the entire one frame. The LR combination unit 8 outputs the motion vector MV1 as the motion vector MV, as shown in FIG. 7(E).

As described above, according to the motion vector detecting apparatus and the motion vector detecting method of the present embodiment, even though an image signal is a pulldown-converted 3D image signal, a motion vector may be detected with high precision. If the motion vector detector MVD detects the motion vector MV1 by increasing the number of pixels by compensating for thinned-out pixels of the 3D image signal F0 or detects the motion vector MV1 by increasing the number of pixels by compensating for non-existing pixels, a motion vector may be detected with higher precision.

Also, according to the motion vector detecting apparatus and the motion vector detecting method of the present embodiment, when the motion vector detecting apparatus detects that the 3D image signal F0 is not a pulldown-converted image signal, the LR separating unit 3 outputs frames without separating the left-eye image signal L and the right-eye image signal R of each frame, and the frame delay LR separating unit 2 outputs the previous frame of one frame of each of the frames output by the LR separating unit 3 without separating the left-eye image signal L and the right-eye image signal R of each frame, and thus, the motion vector detector MVD may perform a general operation for detecting a motion vector.

<Embodiment of Apparatus and Method of Processing Image Signal>

Figure 8:
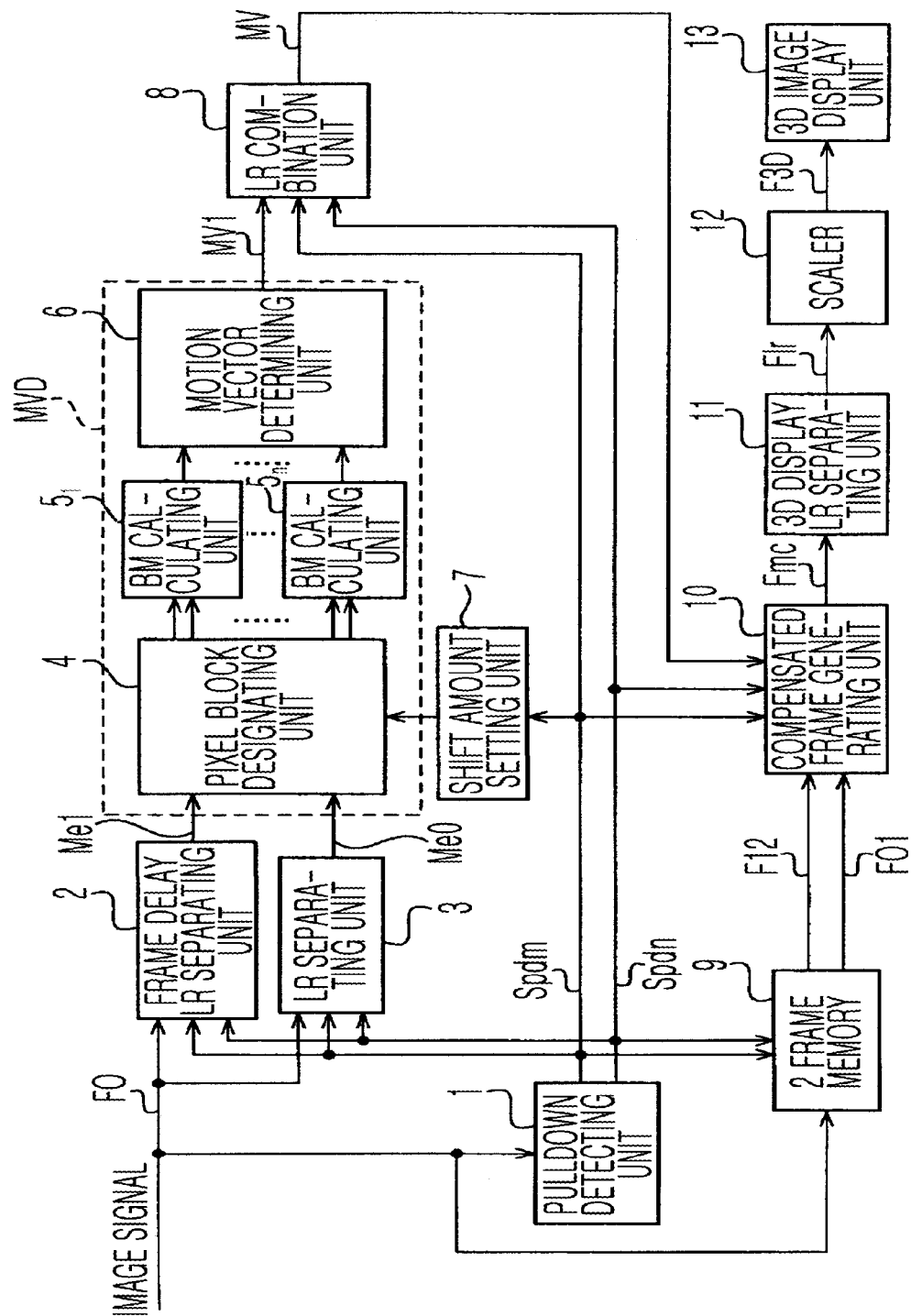
FIG. 8 is a block diagram of an image signal processing apparatus according to an embodiment of the present invention.

An image signal processing apparatus shown in FIG. 8 is a 3D display device equipped with a film judder removing apparatus formed by using the motion vector detecting apparatus of FIG. 1. In FIG. 8, the same reference numerals as in FIG. 1 denote the same components, and a description thereof is omitted.

In FIG. 8, the 3D image signal F0, the mode detecting signal Spdm, and the sequence management number Spdn are input to a 2 frame memory 9. The motion vector MV, the mode detecting signal Spdm, and the sequence management number Spdn, which are output from the LR combination unit 8, and image signals F01 and F12, which are output from the 2 frame memory 9 and are described below, are input to a compensated frame generating unit (motion-compensated frame generating unit) 10. As shown in FIG. 9(A), the motion vector MV alternately repeats the same motion vector during three frames and the same motion vector during two frames as in the motion vector vLR01 continuing for three frames, the motion vector vLR12 continuing for two frames, and the motion vector vLR23 continuing for three frames. FIG. 9(B) shows the sequence management number Spdn.

When the mode detecting signal Spdm shows a pulldown mode, the 2 frame memory 9 delays the 3D image signal F0 by one frame, and thus, the 2 frame memory 9 outputs the delayed 3D image signal F0 as the image signal F01. The image signal F01 is the frames LR1-1, LR1-2, LR1-3, etc., as shown in FIG. 9(D). Also, when the mode detecting signal Spdm shows a pulldown mode, the 2 frame memory 9 delays the 3D image signal F0 by two frames, and thus, the 2 frame memory 9 outputs the 3D image signal F0 as an image signal F12 by properly repeating the delayed 3D image signal F0 according to the sequence management number Spdn. In the image signal F12, the frame LR0-2 continues during three frames, the frame LR1-3 continues during two frames, and the frame LR2-2 continues during three frames, as shown in FIG. 9(C).

When the mode detecting signal Spdm shows a pulldown mode, the compensated frame generating unit 10 generates a compensated frame (motion-compensated frame) by synthesizing pixel data of the image signal F12 shown in FIG. 9(C) and pixel data of the image signal F01 shown in FIG. 9(D) based on the motion vector MV when the sequence management number Spdn is a number other than 3, and outputs the image signal F01 of FIG. 9(D) as the original image when the sequence management number Spdn is 3. An output of the compensated frame generating unit 10 is a motion-compensated frame signal Fmc.

In detail, the compensated frame generating unit 10 generates a compensated frame LR0.2 in the frame LR0-2 of the image signal F12 and in the frame LR1-1 of the image signal F01 as shown in FIG. 9(E). The compensated frame generating unit 10 generates a compensated frame LR0.6 in the frame LR0-2 of the image signal F12 and in the frame LR1-2 of the image signal F01. The compensated frame generating unit 10 leaves the frame LR1-3 of the image signal F01 as a frame LR1.

Also, the compensated frame generating unit 10 generates a compensated frame LR1.4 in the frame LR1-3 of the image signal F12 and in the frame LR2-1 of the image signal F01, and generates a compensated frame LR1.8 in the frame LR1-3 of the image signal F12 and in the frame LR2-2 of the image signal F01. The compensated frame generating unit 10 generates a compensated frame LR2.2 in the frame LR2-2 of the image signal F12 and in the frame LR3-1 of the image signal F01, and generates a compensated frame LR2.6 in the frame LR2-2 of the image signal F12 and in the frame LR3-2 of the image signal F01. The compensated frame generating unit 10 leaves the frame LR3-3 of the image signal F01 as a frame LR3. The compensated frame generating unit 10 outputs these frames as a motion-compensated frame signal Fmc.

Figure 10A:
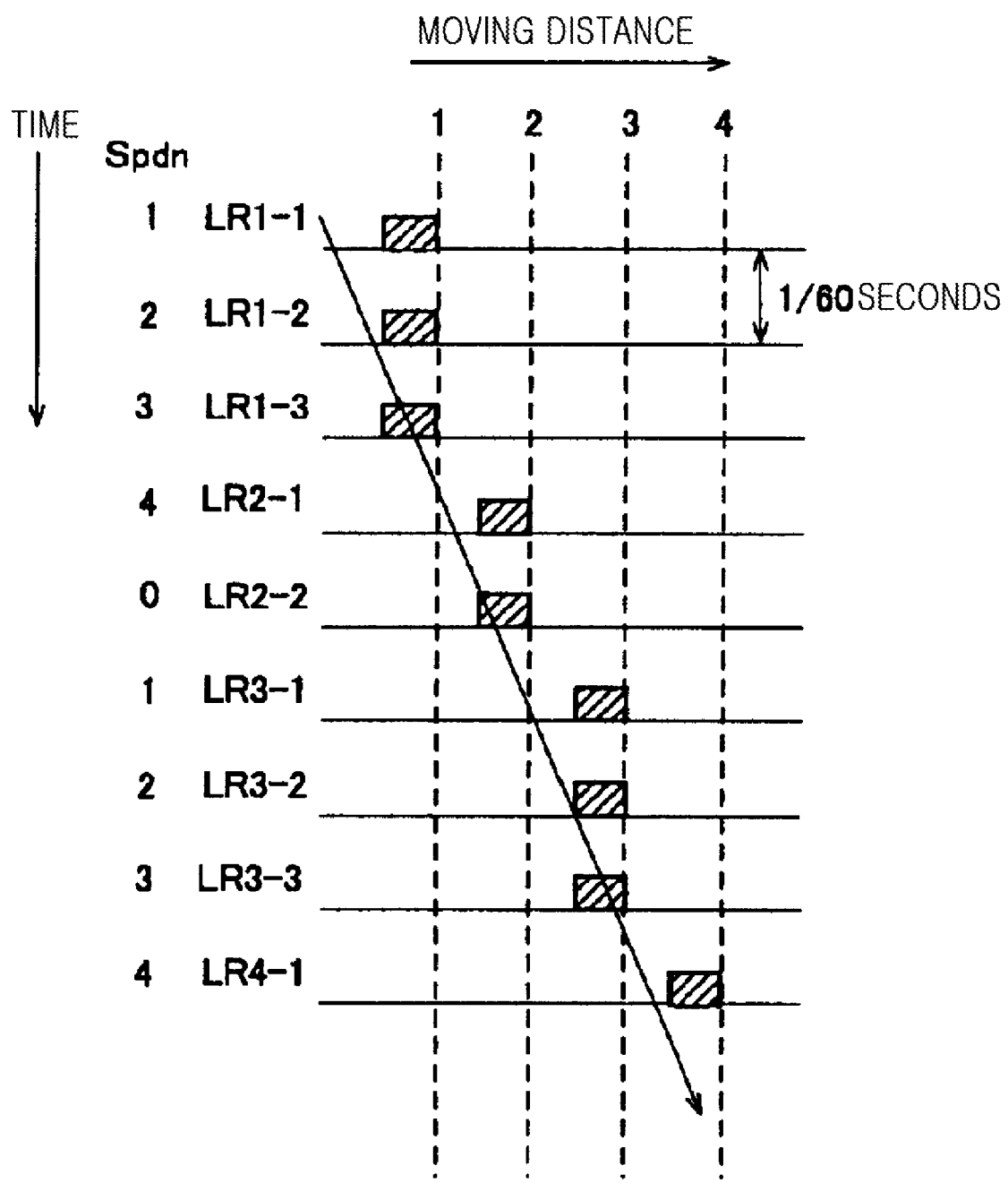

FIG. 10 shows the image signal F01 and the motion-compensated frame signal Fmc output from the compensated frame generating unit 10. The image signal F01 is a 2-3 pulldown-converted image signal, and thus, the image signal F01 has a rough motion as shown in FIG. 10A. The frame LR1-1 of FIG. 10A is replaced by the compensated frame LR0.2, as shown in FIG. 10B, and the frame LR1-2 of FIG. 10A is replaced by the compensated frame LR0.6, as shown in FIG. 10B. The frame LR1-3 of FIG. 10A is left as the frame LR1, as shown in FIG. 10B.

The frames LR2-1, LR2-2, LR3-1, and LR3-2 of FIG. 10A are replaced by the compensated frames LR1.4, LR1.8, LR2.2, and LR2.6 as shown in FIG. 10B, respectively. The frame LR4-1 of FIG. 10A is left as the frame LR3, as shown in FIG. 10B. The frame LR4-1 of FIG. 10A is replaced by a compensated frame LR3.4, as shown in FIG. 10B. The film judder is removed from the motion-compensated frame signal Fmc, and thus, the motion-compensated frame signal Fmc has a smooth motion, as shown in FIG. 10B.

Referring back to FIG. 8, the motion-compensated frame signal Fmc is input to a 3D display LR separating unit 11. The 3D display LR separating unit 11 separates the frames LR0.2, LR0.6, LR1, LR1.4, etc. of the motion-compensated frame signal Fmc into image signals L0.2, L0.6, L1, L1.4, etc. corresponding to the left-eye image signal L and image signals R0.2, R0.6, R1, R1.4, etc. corresponding to the right-eye image signal R, as shown in FIG. 9(F), and thus, the 3D display LR separating unit 11 outputs the separated image signals as an LR separation signal Flr every 1/120 seconds. The LR separation signal Flr is input to a scaler 12.

Since the left-eye image signals L0.2, L0.6, L1, L1.4, etc. and the right-eye image signals R0.2, R0.6, R1, R1.4, etc, of the LR separation signal Fir are compressed to half in a horizontal direction, the scaler 12 doubles the left-eye image signals L0.2, L0.6, L1, L1.4, etc. and the right-eye image signals R0.2, R0.6, R1, R1.4, etc. in a horizontal direction. The scaler 12 supplies a 3D display image signal F3D that is doubled in the horizontal direction to a 3D image display unit 13. As shown in FIG. 9(G), the 3D display image signal F3D is left-eye image signals L0.2s, L0.6s, L1s, L1.4s, etc. in which the left-eye image signals L0.2, L0.6, L1, L1,4, etc. are extended in the horizontal direction and right-eye image signals R0.2s, R0.6s, R1s, R1.4s, etc. in which the right-eye image signals R0.2, R0.6, R1, R1.4, etc. are extended in the horizontal direction, respectively.

The 3D image display unit 13 alternately displays the left-eye image signals L0.2s, L0.6s, L1s, L1.4s, etc. and the right-eye image signals R0.2s, R0.6s, R1s, R1.4s, etc, for each 1/120 seconds. A viewer wears, for example, liquid crystal shutter glasses to view the 3D display image signal F3D displayed on the 3D image display unit 13.

A displaying time of the 3D display image signal F3D on the 3D image display unit 13 and a driving time of the liquid crystal shutter glasses are synchronized to close a liquid crystal shutter for the left eye at the time when the left-eye image signals L0.2s, L0.6s, L1s, L1.4s, etc are displayed and to close a liquid crystal shutter for the right eye at the time when the right-eye image signals R0.2s, R0.6s, R1s, R1.4s, etc. are displayed. Thus, the viewer may view a 3D image.

According to the motion vector detecting apparatus and the motion vector detecting method of the present embodiment, even though an image signal is a pulldown-converted 3D image signal, a motion vector may be detected with high precision. Also, according to the motion vector detecting apparatus and the motion vector detecting method of the present embodiment, even though an image signal is a pulldown-converted 3D image signal, a motion vector may be detected with high precision, and thus, a motion-compensated frame having a high image quality may be generated.

As described above, according to the motion vector detecting apparatus and the motion vector detecting method of the present embodiment, even though an image signal is a pulldown-converted 3D image signal, a motion vector may be detected with high precision, and thus, a motion-compensated frame having a high image quality may be generated. According to the image signal processing apparatus and image signal processing method of the present embodiment, film judder may be effectively removed.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A motion vector detecting apparatus comprising:
a pulldown detecting unit which detects whether a 3D image signal in which a left-eye image signal and a right-eye image signal are compressed and disposed within one frame is a pulldown-converted image signal;
an LR separating unit which outputs an LR separation signal separated into the left-eye image signal and the right-eye image signal in each of frames having the same image content by sequentially separating the left-eye image signal and the right-eye image signal for each frame in any order within a repetition period in which frames having the same image content are repeated, when the pulldown detecting unit detects that the 3D image signal is a pulldown-converted image signal;
a frame delay LR separating unit which outputs a frame delay LR separation signal separated into a left-eye image signal and a right-eye image signal in a frame before one repetition period by allowing the left-eye image signal and the right-eye image signal of the LR separation signal to correspond to each other, when the pulldown detecting unit detects that the 3D image signal is a pulldown-converted image signal;
a motion vector detecting unit which detects a first motion vector of the left-eye image signal through the left-eye image signal of the LR separation signal and the left-eye image signal of the frame delay LR separation signal and a second motion vector of the right-eye image signal through the right-eye image signal of the LR separation signal and the right-eye image signal of the frame delay LR separation signal; and
an LR combination unit which delays any one of the first motion vector and the second motion vector to coincide the timings of both frames and combines the first motion vector and the second motion vector in units of frames to output the combined first motion vector and second motion vector as a motion vector.

2. The motion vector detecting apparatus of claim 1, wherein the motion vector detecting unit detects the first and second motion vectors by increasing the number of pixels by compensating for thinned out pixels in the 3D image signal.

3. The motion vector detecting apparatus of claim 1, wherein the motion vector detecting unit detects the first and second motion vectors by increasing the number of pixels by compensating for non-existing pixels in the 3D image signal.

4. The motion vector detecting apparatus of claim 1, wherein the 3D image signal is a 2-3 pulldown-converted image signal,
wherein the LR separating unit sequentially separates the left-eye image signal and the right-eye image signal in an initial frame and the next frame from among three frames in any order within a first repetition period in which frames having the same image content are repeated for three frames,
wherein the LR separating unit sequentially separates the left-eye image signal and the right-eye image signal in any order within a second repetition period in which frames having the same image content are repeated for two frames.

5. The motion vector detecting apparatus of claim 1, wherein when the pulldown detecting unit detects that the 3D image signal is not a pulldown-converted image signal, the LR separating unit outputs the frames without separating the left-eye image signal and the right-eye image signal of each of the frames,
wherein the frame delay LR separating unit outputs the previous frame of one frame of each of the frames output from the LR separating unit without separating the left-eye image signal and the right-eye image signal of each of the frames,
wherein the motion vector detecting unit detects motion vectors of each of the frames by using an image signal of the frame output from the LR separating unit and an image signal of the frame output from the frame delay LR separating unit.

6. An image signal processing apparatus comprising:
the motion vector detecting apparatus of claim 1; and
a motion-compensated frame generating unit which generates a motion-compensated frame by using a 3D image signal and a motion vector detected by the motion vector detecting apparatus when it is detected that the 3D image signal is a pulldown-converted image signal and at least partially replaces a real frame of the 3D image signal by the motion-compensated frame.

7. A motion vector detecting method comprising:
detecting whether a 3D image signal in which a left-eye image signal and a right-eye image signal are compressed and disposed within one frame is a pulldown-converted image signal;
generating an LR separation signal separated into the left-eye image signal and the right-eye image signal in each of frames having the same image content by sequentially separating the left-eye image signal and the right-eye image signal for each frame in any order within a repetition period in which frames having the same image content are repeated, when it is detected that the 3D image signal is a pulldown-converted image signal;
generating a frame delay LR separation signal separated into a left-eye image signal and a right-eye image signal in a frame before one repetition period by allowing the left-eye image signal and the right-eye image signal of LR separation signal to correspond to each other, when it is detected that the 3D image signal is a pulldown-converted image signal;
detecting a first motion vector of the left-eye image signal through the left-eye image signal of the LR separation signal and the left-eye image signal of the frame delay LR separation signal;
detecting a second motion vector of the right-eye image signal through the right-eye image signal of the LR separation signal and the right-eye image signal of the frame delay LR separation signal; and
generating motion vectors of each of the frames by delaying any one of the first motion vector and the second motion vector to coincide the timings of both frames and combining the first motion vector and the second motion vector in units of frames.

8. The method of claim 7, wherein the first and second motion vectors are detected by increasing the number of pixels by compensating for thinned out pixels in the 3D image signal.

9. The method of claim 7, wherein the first and second motion vectors are detected by increasing the number of pixels by compensating for non-existing pixels in the 3D image signal.

10. The method of claim 7, wherein the 3D image signal is a 2-3 pulldown-converted image signal,
wherein the left-eye image signal and the right-eye image signal are sequentially separated in an initial frame and the next frame from among three frames in any order within a first repetition period in which frames having the same image content are repeated for three frames,
wherein the left-eye image signal and the right-eye image signal are sequentially separated in any order within a second repetition period in which frames having the same image content are repeated for two frames.

11. The method of claim 7, wherein when it is detected that the 3D image signal is not a pulldown-converted image signal, a pair of frames that are offset by one frame are sequentially generated without separating the left-eye image signal and the right-eye image signal in each of the frames, and the motion vectors of the frames are detected by using the images signals of the two frames.

12. An image signal processing method comprising:
generating a motion-compensated frame by using a 3D image signal in which a left-eye image signal and a right-eye image signal are compressed and disposed within one frame and a pulldown-converted and using a motion vector detected through the motion vector detecting method of claim 7; and
at least partially replacing a real frame of the 3D image signal by the motion-compensated frame.

\* \* \* \* \*